(12) United States Patent
Peranandam et al.

(10) Patent No.: US 12,361,340 B1
(45) Date of Patent: Jul. 15, 2025

(54) PARKING AND CHARGING MARKETPLACE AND RESERVATION SYSTEM

(71) Applicant: GM Global Technology Operations LLC, Detroit, MI (US)

(72) Inventors: Prakash M. Peranandam, Rochester Hills, MI (US); Paolo Giusto, Brentwood, CA (US); Arun Adiththan, Sterling Heights, MI (US); Daniel Bouie, Sunnyvale, CA (US); Azeem Sarwar, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/410,220

(22) Filed: Jan. 11, 2024

(51) Int. Cl.
  *G06Q 10/02* (2012.01)
  *B60W 30/06* (2006.01)
  *G01C 21/34* (2006.01)
  *G08G 1/14* (2006.01)
  *H04L 9/40* (2022.01)

(52) U.S. Cl.
  CPC ............ *G06Q 10/02* (2013.01); *B60W 30/06* (2013.01); *G01C 21/34* (2013.01); *G08G 1/148* (2013.01); *H04L 63/08* (2013.01)

(58) Field of Classification Search
  CPC ....... G06Q 10/02; B60W 30/06; G01C 21/34; G08G 1/148; H04L 63/08; H04L 9/32
  See application file for complete search history.

(56) References Cited

U.S. PATENT DOCUMENTS

| | | | |
|---|---|---|---|
| 7,956,769 B1* | 6/2011 | Pearl | G08G 1/14 340/539.11 |
| 7,966,215 B1* | 6/2011 | Myers | G08G 1/096838 705/13 |
| 2015/0066545 A1* | 3/2015 | Kotecha | G06Q 10/02 705/5 |
| 2018/0181768 A1* | 6/2018 | Leporini | H04L 63/08 |

FOREIGN PATENT DOCUMENTS

| | | |
|---|---|---|
| DE | 102014209453 A1 | 11/2015 |
| JP | 2007164554 A | 6/2007 |

* cited by examiner

*Primary Examiner* — Jeff Zimmerman
*Assistant Examiner* — Duane N. Moore
(74) *Attorney, Agent, or Firm* — Vivacqua Crane, PLLC (57) ABSTRACT

A resource sharing marketplace platform for vehicle parking spots includes a back-office server including a controller adapted to run a plurality of integrated systems and a wireless communication module in communication with the controller, wherein, the resource sharing marketplace platform is adapted to receive, via the wireless communication module, a request from a user, collect, via the wireless communication module, data related to available registered parking spots from a network database of registered parking spots, and provide a response to the user including a sub-group of registered parking spots.

2 Claims, 5 Drawing Sheets

SPOT LOCATION=42.669150, -83.174288
OF SPOTS=1
DAY=ALL WEEKDAYS EXCEPT TUESDAY
TIME=6 TO 21 HRS
SPOT LOCATION AND DIMENSIONS=FACING GARAGE, 5 FOOT FROM ROAD
         WALKWAY, LEFT SIDE, BEFORE HOUSE
         WALKWAY & MAX 21' L X 9' W X 9' H
SURROUNDINGS: 5 MIN WALK TO RESTAURANTS, DOWNTOWN, OFFICE AREA
MAX DURATION=MAX 3 HRS.
EXTENDABLE=YES, IF AVAILABLE
RECURRING=YES UNTIL OTHERWISE SPECIFIED
RESTRICTION: NO RVS
STATUS=OPEN<BLOCKED/OPEN>
CHARGING=LEVEL 2 AVAILABLE; POWER SOURCE: GRID/SOLAR/WIND
VEH. TYPE=SEDAN/SUV/REGULAR TRUCK
PRICING=WITHOUT CHARGING $5/HR & WITH CHARGING $15/HR+
   CONSUMED UNIT PRICE IF WITHIN PRIVATE NETWORK CHARGES=$0
MONITORING METHOD=CITY CCTV, HOUSE CAMERA;
PAYMENT INFO. :<BANK/PAYPAL ACCOUNT DETAILS>
POLICIES=ANY DELAYS OR OVERTIME PARKING IS FINED 150$+TOWING
   CHARGES, NO NEGOTIATIONS, PARK AT YOUR OWN RISK, NO
   INSURANCE & RESPONSIBLE FOR ANY DAMAGES, CHARGING IS
   FREE, ETC.

FIG. 7

PARKING AND CHARGING MARKETPLACE AND RESERVATION SYSTEM

INTRODUCTION

The present disclosure relates to a resource sharing marketplace platform and system for dynamically providing access to public and private networks of parking/charging spots for a vehicle.

Searching for parking spots that are adapted to accommodate vehicles and provide specific dynamic parameters (size of vehicle, length of time needed, location, provision of charging for electric vehicles, charge for use of the parking/charging spot, etc.) is time consuming for a user. While there are various public and private parking spots available to a user, there is no platform that allows owners of a parking spot to dynamically register a parking spot and create/modify dynamic parameters associated with the parking spot and allows users to access the platform to identify available parking spots that satisfy their requirements and reserve the parking spot.

Thus, while current resources achieve their intended purpose, there is a need for a new and improved resource sharing marketplace platform for dynamically creating and providing access to public and private networks of parking/charging spots for vehicles and methods for using such resource sharing marketplace platform.

SUMMARY

According to several aspects, of the present disclosure, a resource sharing marketplace platform for vehicle parking and charging spots includes a back-office server including a controller adapted to run a plurality of integrated systems and a communication module in communication with the controller, wherein, the resource sharing marketplace platform is adapted to receive, via the communication module, a request from a user, collect, via the communication module, data related to available registered parking spots from a network database of registered parking spots, and provide a response to the user including a sub-group of registered parking spots.

According to another aspect, the plurality of integrated systems includes a gateway system adapted to authenticate user identification, facilitate the user's log in to the resource sharing marketplace platform, and receive the request from the user.

According to another aspect, the plurality of integrated systems includes a query builder adapted to identify dynamic parameters related to the request from the user.

According to another aspect, the plurality of integrated systems includes a query analyzer adapted to identify, from the network database of registered parking spots, the sub-group of registered parking spots that satisfy the dynamic parameters related to the request from the user and are available to the user.

According to another aspect, the plurality of integrated systems includes a contract builder adapted to develop a contract between the user and an owner of a registered parking spot that satisfies the dynamic parameters related to the request from the user and is available to the user.

According to another aspect, the plurality of integrated systems includes a messaging broker adapted to send a request for access to registered parking spots that satisfy the dynamic parameters related to the request from the user and are available to the user to owners of the registered parking spots that satisfy the dynamic parameters related to the request from the user and are available to the user, and a solving engine adapted to select the sub-group of registered parking spots that satisfy the dynamic parameters related to the request from the user and are available to the user, and negotiate the contract between the user and the owner of a registered parking spot that satisfies the dynamic parameters related to the request from the user, is available to the user and is selected by the user.

According to another aspect, the network database of registered parking spots is adapted to allow an owner of a parking spot to, via the communication module, register a parking spot within the network database, enter dynamic parameters associated with the registered parking spot, modify the dynamic parameters associated with the registered parking spot, and remove a registered parking spot from the network database.

According to another aspect, the plurality of integrated systems includes a monitoring engine adapted to receive input, via the communication module, from external monitoring sources and to determine a status of a registered parking spot, including at least one of: when a user arrives at the registered parking spot, if the user's vehicle is properly parked within the registered parking spot, if the user's vehicle meets dynamic parameter specifications for the registered parking spot and if the user leaves the registered parking spot at an appropriate time.

According to another aspect, the network database of registered parking spots is adapted to update the dynamic parameters for a registered parking spot based on formation of a contract between the user and owner of the registered parking spot, and data received, via the monitoring engine, of the status of the registered parking spot.

According to another aspect, the back-office server is adapted to, when the user's vehicle is equipped with autonomous driving capability, send GPS data to an autonomous vehicle control system within the user's vehicle to allow the user's vehicle to autonomously navigate to the registered parking spot, when the user's vehicle is not equipped with autonomous driving capability, send GPS data to a navigation system within the user's vehicle, when the user's vehicle is equipped with an automated parking assistance system, uploading dynamic parameters of the registered parking spot to the automated parking assistance system of the user's vehicle, and when the user's vehicle is not equipped with an automated parking assistance system, uploading dynamic parameters of the registered parking spot to a human machine interface display within the user's vehicle.

According to several aspects of the present disclosure, a method of providing vehicle parking spots with a resource sharing marketplace platform includes receiving, via a wireless communication module in communication with a controller of a back-office server that is adapted to run a plurality of integrated systems, a request from a user, collecting, via the wireless communication module, data related to available registered parking spots from a network database of registered parking spots, and providing a response to the user including a sub-group of registered parking spots.

According to another aspect, the plurality of integrated systems includes a gateway system and a query builder, the method including authenticating user identification, facilitating the user's log in to the resource sharing marketplace platform, and receiving the request from the user with the gateway system, and identifying, with the query builder, dynamic parameters related to the request from the user.

According to another aspect, the plurality of integrated systems includes a query analyzer, the collecting, via the wireless communication module, data related to available registered parking spots from a network database of registered parking spots including identifying, with the query analyzer, from the network database of registered parking spots, the sub-group of registered parking spots that satisfy the dynamic parameters related to the request from the user and are available to the user.

According to another aspect, the plurality of integrated systems includes a contract builder, the method including developing, with the contract builder, a contract between the user and an owner of a registered parking spot that satisfies the dynamic parameters related to the request from the user and is available to the user.

According to another aspect, the plurality of integrated systems includes a messaging broker and a solving engine, the identifying, with the query analyzer, from the network database of registered parking spots, the sub-group of registered parking spots that satisfy the dynamic parameters related to the request from the user and are available to the user further includes selecting, with the solving engine, the sub-group of registered parking spots that satisfy the dynamic parameters related to the request from the user and are available to the user, and the developing, with the contract builder, a contract between the user and an owner of a registered parking spot that satisfies the dynamic parameters related to the request from the user and is available to the user further includes sending, with the messaging broker, a request for access to registered parking spots that satisfy the dynamic parameters related to the request from the user and are available to the user to owners of the registered parking spots that satisfy the dynamic parameters related to the request from the user and are available to the user, and negotiating, with the solving engine, a contract between the user and the owner of a registered parking spot that satisfies the dynamic parameters related to the request from the user, is available to the user and is selected by the user.

According to another aspect, the method further includes registering, by an owner, via the wireless communication module, a parking spot within the network database, entering, by the owner, via the wireless communication module, dynamic parameters associated with the registered parking spot, and modifying, by the owner, via the wireless communication module, the dynamic parameters associated with the registered parking spot.

According to another aspect, the plurality of integrated systems includes a monitoring engine, the method including receiving input, with the monitoring engine, via the wireless communication module, from external monitoring sources and determining, with the monitoring engine, a status of a registered parking spot, including at least one of: when a user arrives at the registered parking spot, if the user's vehicle is properly parked within the registered parking spot, if the user's vehicle meets dynamic parameter specifications for the registered parking spot and if the user leaves the registered parking spot at an appropriate time, and updating, with the network database, the dynamic parameters for a registered parking spot based on formation of a contract between the user and owner of the registered parking spot, and data received, via the monitoring engine, of the status of the registered parking spot.

According to another aspect, the method further includes, when the user's vehicle is equipped with autonomous driving capability, sending, with the back-office server, via the wireless communication module, GPS data to an autonomous vehicle control system within the user's vehicle to allow the user's vehicle to autonomously navigate to the registered parking spot, when the user's vehicle is not equipped with autonomous driving capability, sending, with the back-office server, via the wireless communication module, GPS data to a navigation system within the user's vehicle, when the user's vehicle is equipped with an automated parking assistance system, uploading, with the back-office server, via the wireless communication module, dynamic parameters of the registered parking spot to the automated parking assistance system of the user's vehicle, and when the user's vehicle is not equipped with an automated parking assistance system, uploading, with the back-office server, via the wireless communication module, dynamic parameters of the registered parking spot to a human machine interface display within the user's vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with marine craft, other vehicles, drones, e-bikes, robots, trailers and consumer electronic components.

Figure 1:
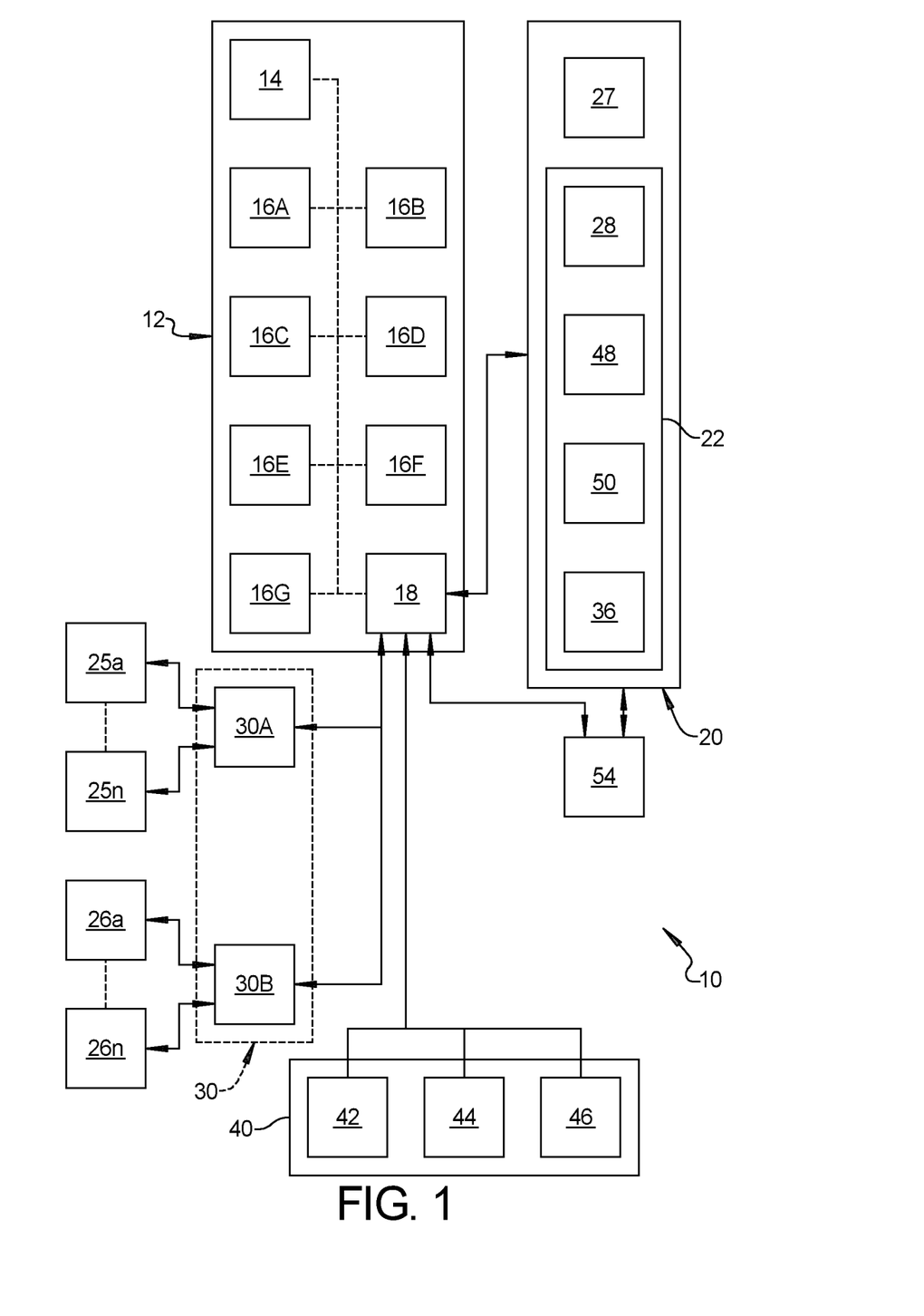
FIG. 1 is a schematic diagram of a resource sharing marketplace platform according to an exemplary embodiment.

Referring to FIG. 1, a resource sharing marketplace platform 10 in accordance with an exemplary embodiment of the present disclosure includes a back-office server 12 including a controller 14 adapted to run a plurality of integrated systems 16A-16G and a wireless communication module 18 in communication with the controller 14. The back-office server 12 supports all aspects of the resource sharing marketplace platform 10, and may be cloud based.

The controller 14 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The resource sharing marketplace platform 10 is adapted to receive, via the wireless communication module 18, a request from a user 20. A user 20 is a driver or owner or a management system of a vehicle 22 who needs to find and reserve a parking or charging spot 24 for the vehicle 22. The vehicle 22 may require the parking spot 24 to meet certain dynamic parameters. For example, the vehicle 22 may be a large pick-up truck with an extended cap and long bed, thus requiring the parking spot 24 to be large enough to accommodate the vehicle 22. The vehicle 22 may be a motorhome which would require an even larger parking spot 24, and the parking spot 24 would need to be able to accommodate the height of a motorhome. The vehicle 22 may be an electric vehicle, wherein the user 20 is looking for a parking spot 24 that not only provides dimensional dynamic parameters to accommodate the vehicle 22 but also provides capability for charging of the vehicle 22 while the vehicle 22 is parked there.

The user 20 may access the resource sharing marketplace platform 10 via an application on a personal device 27, such as a cell phone, tablet or computer, or, the user 20 may access the resource sharing marketplace platform 12 directly through a human machine interface (HMI) 28 of the infotainment system within the vehicle 22. The user 20 provides requirements (dynamic parameters) such as the dimensions of the vehicle 22, at what time and for how long the parking spot 24 will be needed, and if charging is required within the request. The user 20 may also provide limits on how much the user 20 is willing to pay for the parking spot 24.

The back-office server 12 includes a wireless communication module 18 in communication with the controller 14 that is adapted to allow wireless communication between the back-office server 12, users 20 of the resource sharing marketplace platform 10, owners of parking spots 24 and other external sources. Wireless communication, with the wireless communication module 18, is enabled via a wireless data communication network over wireless communication channels such as a WLAN, 4G/LTE or 5G network, or the like.

Once the resources sharing marketplace platform 12 receives, via the wireless communication module 18, a request from a user 20, the back-office server 12 collects, via the wireless communication module 18, data related to available registered parking spots 24 from a plurality of network databases 30 of registered parking spots 24. The plurality of network databases 30 of registered parking spots 24 may include a public database 30A that is available to any user 20. The plurality of network databases 30 of registered parking spots 24 may include a private network 30B, set up for access only by specific authorized users 20. A public network database 30A is populated with data related to parking spots 24 that have been registered by a plurality of owners 25a-25n and a private network database 30B is populated with data related to parking spots 24 that have been registered by a plurality of owners 26a-26n. For example, an owner of a home near a university football stadium may wish to utilize their driveway for parking for students on gamedays. This owner can create a network 30A, 30B that is only accessible and usable by students of the university, and tailor the dynamic parameters associated with the parking spot 24 to accommodate only passenger vehicles along with the cost information and only on gamedays starting one hour before the game and extending until one hour after the game. The dimensions and the parking area can be logically marked and can be rendered in the user application either through an image or augmented/Virtual reality (AR/VR) for easy identification of the exact spot. The parking space owner can remove the parking from the network at any point of time.

Figure 2:
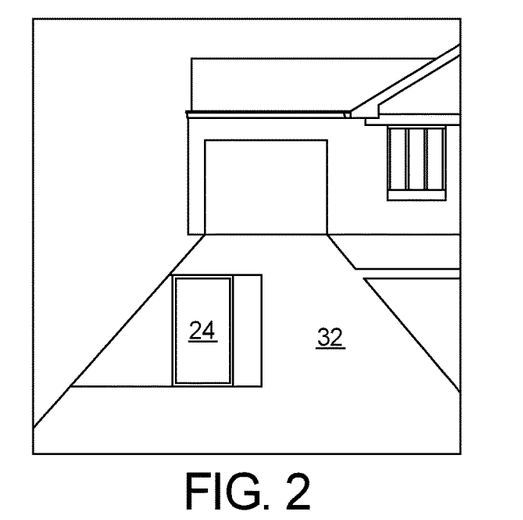
FIG. 2 is a perspective view of a registered parking spot located within a driveway of a home.
Figure 3:
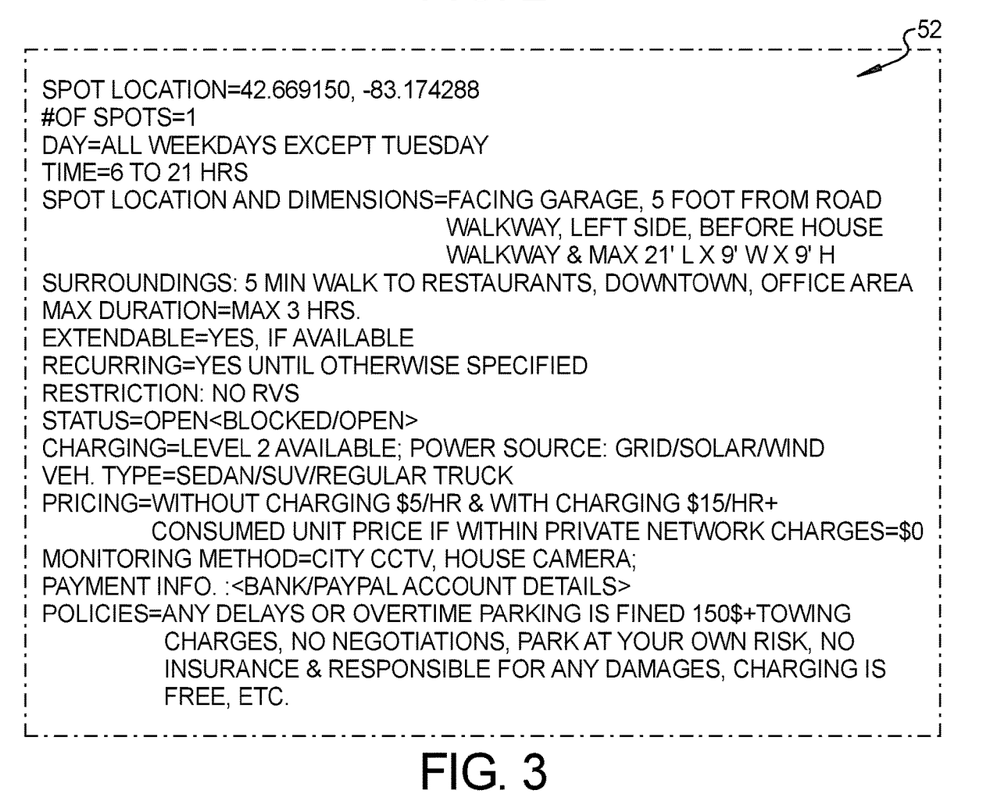
FIG. 3 is a illustration of the dynamic parameters associated with the registered parking spot shown in FIG. 2.
Figure 4:
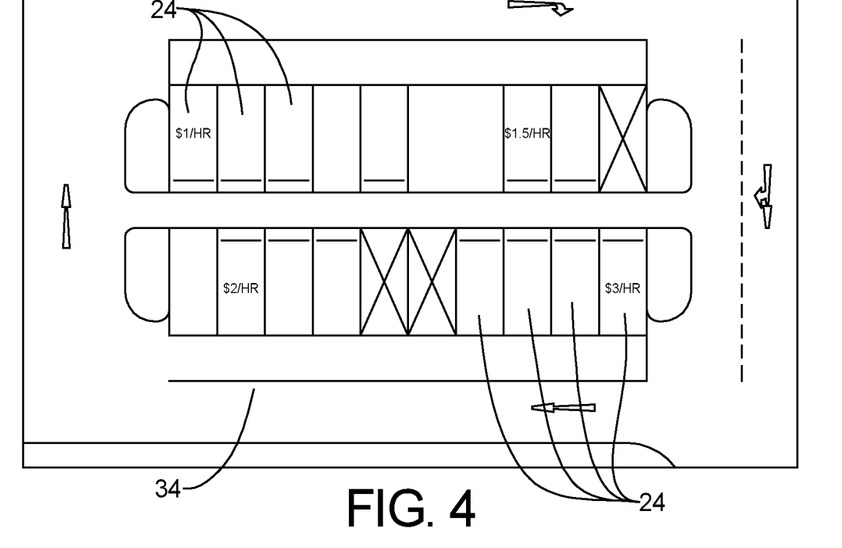
FIG. 4 is a top view of a city parking lot including a plurality of registered parking spots.

Each network database 30A, 30B of registered parking spots 24 is adapted to allow an owner 25 of a parking spot 24 to access the network 30A, 30B, via the wireless communication module 18 and 1) register a parking spot 24 within the network database 30A, 30B, 2) enter dynamic parameters associated with the registered parking spot 24, and 3) modify the dynamic parameters associated with the registered parking spot 24. For example, referring to FIG. 2, a home owner decides to provide a single parking space 24 in the driveway 32 of the home. The owner registers the parking spot 24 within either a public or private network 30A, 30B and enters dynamic parameters associated with the registered parking spot 24. Referring to FIG. 3, the dynamic parameters provide information about restrictions on the parking spot 24, times when the parking spot 24 is available, if the parking spot 24 provides charging capability, nearby attractions that can be walked to from the parking spot 24, etc. The owner of the parking spot 24 is free to access the network 30A, 30B at any time to modify these dynamic parameters to their preferences. Referring to FIG. 4, a city operated parking lot 34 includes multiple parking spots 24. Each of the parking spots 24 in the city lot 34 are registered individually within a public network 30A associated with the platform 10 and dynamic parameters are entered for each.

The back-office server 12 can search for data from multiple networks 30A, 30B, including public networks 30A supported by government/city run parking lots/structures, privately owned public parking lots/structures and private networks 30B managed by individuals for which the user 20 has access. The back-office server 12 receives data provided by the user 20 within the request related to requirements for the parking spot 24 (dynamic parameters), including location of the parking spot 24 (proximity to shopping, restaurants, etc.) and time and duration the parking spot 24 is needed. Along with the request, the application used by the user 20 to make the request (either application on a personal device 27 or through HMI/infotainment system 28 within the vehicle 22), the back-office server 12 further collects data from sensors 36 within the vehicle 22 related to location of the vehicle 22, speed of the vehicle 22, etc.

The back-office server 12, by analyzing data of available registered parking spots 24, identifies registered parking spots 24 that satisfy the requirements of the user 20, as specified in the request. The back-office server 12 uses information from the sensors 36 within the vehicle 22 to identify registered parking spots 24 that are within an acceptable range of the vehicle 22. The back-office server then provides a response to the user 20 including a sub-group of registered parking spots 24 from which the user 20 may select. The sub-group of registered parking spots 24 are presented to the user 20 on the user's personal device 27 or on the HMI 28 within the vehicle 22.

Figure 5:
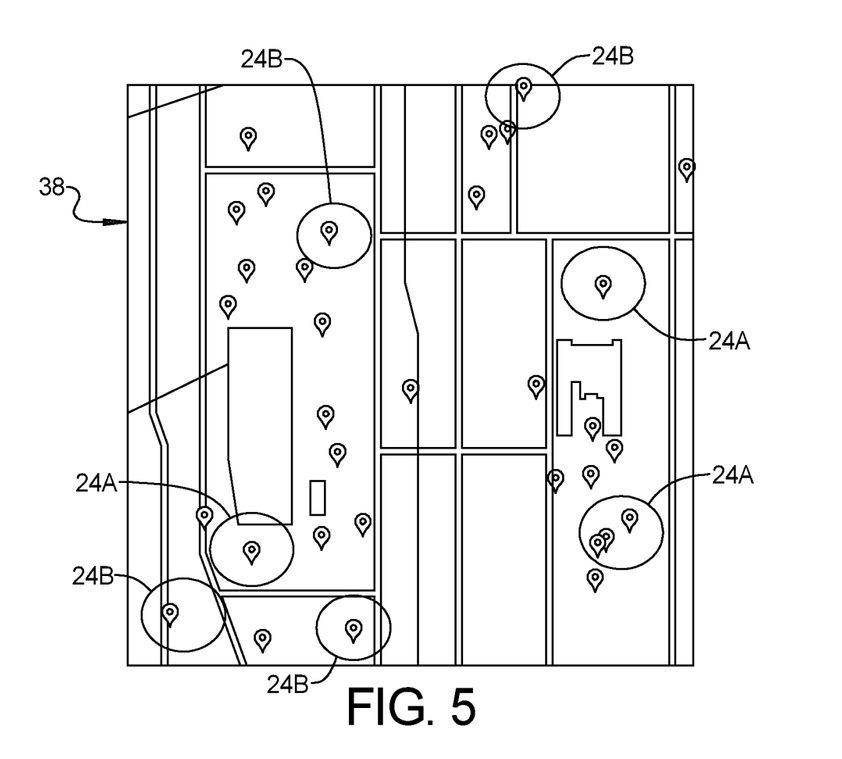
FIG. 5 is a map image that is displayed on a user's personal device or on the HMI of a user's vehicle including identification of acceptable registered parking spots and other nearby parking spots.

Referring to FIG. 5, an example is shown wherein a map image 38 is displayed on a user's personal device 27 or on the HMI 28 of the infotainment system within the user's vehicle 22. The map image 38 includes identification of registered parking spots 24A that meet the user's 20 requested dynamic parameters. Registered parking spots 24A that meet the user's 20 requested dynamic parameters may be labelled and/or highlighted with a color, such as green. As shown, the map image 38 display also includes registered parking spaces 24B that are available nearby, but do not meet the user's 20 requested dynamic parameters. Registered parking spaces 24B that do not meet the user's 20 requested dynamic parameters may be labelled as such and/or highlighted with a color, such as red or yellow. The sub-group of registered parking spots 24 may also be presented to the user 20 is list form, along with information such as distance and cost for each registered parking spot 24 in the list, or both a map image and list may be presented to the user 20.

The request from the user 20 will include mandatory dynamic parameters that must be provided by the user 20. Mandatory dynamic parameters may include dynamic parameters such as the dimensions of the user vehicle 22 to properly allow the back-office server 12 to identify and present appropriate parking spaces 24 to the user 20. The request from the user 20 may also include optional dynamic parameters, that may be provided by the user 20 within the request, but are not required. Optional dynamic parameters that may be provided within a user request include, for example, proximity to local attractions such as restaurants. The user 20 can identify any dynamic parameter as a mandatory dynamic parameter, thus communicating to the platform 10 that any identified parking spot 24 must satisfy that dynamic parameter for the parking spot 24 to be acceptable to the user 20. For example, the user 20 may specify that a mandatory dynamic parameter is that the registered parking spot 24 must be shaded, and not located in direct sunlight. Thus, the sub-group of registered parking spots 24 presented to the user 20 will only include registered parking spots 24 that are located in shaded areas or are covered.

Referring again to FIG. 1, the plurality of integrated systems 16A-16G are located within the back-office server 12 of the resource sharing marketplace platform 10. The plurality of integrated systems 16A-16G includes programs, algorithms, and processes, that perform discreet functions and together provide the functionality of the resource sharing marketplace platform 10. In an exemplary embodiment, the back-office server 12 includes a gateway system 16A, a query builder 16B, a query analyzer 16C, a contract builder 16D, a messaging broker 16E, a solving engine 16F and a monitoring engine 16G.

When a user 20 accesses the resource sharing marketplace platform 10, the gateway system 16A is adapted to authenticate the user's 20 identification, facilitate the user's 20 log in to the resource sharing marketplace platform 10, and receive the request from the user 20. If the user 20 is new to the resource sharing marketplace platform 10, the gateway system 16A will allow the user 20 to create an account and register to use the platform 10.

After a request is received, the query builder 16B is adapted to identify dynamic parameters related to the request from the user 20. Functions of the query builder 16B include defining loosely coupled parameters and value definitions, selecting dynamic sub-parameters based on identified parameters and values, highlighting logic-based primary and optional parameters, and establishing the query architecture template and logic.

The query analyzer 16C is adapted to break down the request from the user 20 and to identify, from the network database of registered parking spots 24, the sub-group of registered parking spots 24 that satisfy the dynamic parameters related to the request from the user 20 and, if the network database 30A, 30B is a private network 30B, are available to the user 20.

By breaking up multivariate (multiple dynamic parameters) requests into univariate or multivariate with fewer variables requests, the query builder (analyzer/decomposer) increases the number of potential registered parking spots that may be identified. For example, if a user 20 submits a multivariate request with multiple dynamic parameters, the back-office server 12 may not identify any parking spots 24 that satisfy all of the dynamic parameters. Thus, the back-office server 12 can identify registered parking spots 24 that satisfy some of the dynamic parameters and prioritize the identified registered parking spots 24 to provide a sub-group of registered parking spots 24 to the user 20 that the user 20 may select from.

The contract builder 16D is adapted to develop a contract including policies, standards and key clauses. The contract builder 16D uses key parameters from the request to create a contract between the user 20 and an owner of a registered parking spot 24 that satisfies the dynamic parameters related to the request from the user 20 and is available to the user 20. The terms of the contract define the fee that the user 20 can expect to pay, calculated based on the rate provided by the owner of the registered parking spot 24 and the time/duration of use provided within the user request and fees for using available charging facilities. The contract builder 16D may be an artificial intelligence powered contract generator that includes terms in the contract that describe the services being requested. Likewise, the contract builder 16D will include relevant key contract clauses, such as, but not limited to, governing law, confidential information, security and privacy information, data breach notice, cooperation with regulators, and platform provider policies. The agreed upon contract terms and clauses may also be stored as a smart contract on a blockchain.

The messaging broker 16E is adapted to send a user's request for access to registered parking spots 24 that satisfy the dynamic parameters includes within the request from the user 20, and are available to the user 20, to owners of the registered parking spots 24 that satisfy the dynamic parameters related to the request from the user 20 and are available to the user 20. After the request has been validated and processed, and the contract has been created, the messaging broker 16E is adapted to facilitate back and forth communication between the user 20 and the owner of the selected registered parking spot 24, including acceptance of the terms of the contract by the user 20 and/or negotiation of the terms between the user 20 and the owner of the registered parking spot 24.

A user 20 may be any individual who has signed up with the resource sharing marketplace platform 10 by providing contact information to the platform 10, established payment methods either directly or through a third party payment processing service 54. The vehicles 22 of each user 20 must include onboard sensors 36, systems and a wireless communication module to allow contact and communication between the user 20 and the resource sharing marketplace platform 10.

In an exemplary embodiment, the back-office server 12 and the solving engine 16F ranks identified registered parking spots 24 based on current location and how closely the identified registered parking spots 24 match dynamic parameters specified in the user request to further narrow the list of registered parking spots 24 includes in the sub-group provided to the user 20. The system 11 may annotate the available registered parking spots 24 with match percentage with respect to the user requested criteria and sort accordingly. E.g.: Spot 1 is a 95% match, Spot 2 is 80% match. The solving engine 16F is adapted to select the sub-group of registered parking spots 24 that satisfy the dynamic parameters related to the request from the user 20 and are available to the user 20, and to negotiate the contract between the user 20 and the owner of a registered parking spot 24 that satisfies the dynamic parameters related to the request from the user 20, is available to the user 20 and is selected by the user 20.

During contract formation, the user 20 and the owner of the selected registered parking spot 24 have the opportunity to negotiate the calculated fees. The application for the resource sharing marketplace platform 10 allows the owner of the selected registered parking spot 24 to respond by acceptance, rejection, or counter-offer. If an owner of a selected registered parking spot 24 feels the service warrants a larger fee, they can request it.

The plurality of integrated systems 16A-16G includes a monitoring engine 16G adapted to receive input, via the wireless communication module 18, from external monitoring sources 40 and to determine a status of a registered parking spot 24. External monitoring sources 40 may include cameras 42 from government or city operated CCTV systems that are accessible by the back-office server 12 or are installed an managed by an owner of a registered parking spot 24 and have been linked to provide data to the platform 10, dynamic observation systems 44, or data from electric vehicle charging networks 46 that are linked to a registered parking spot's charging facilities that provide data on current status of the charging station at a registered parking spot 24. The monitoring engine 16G, using data from such external monitoring sources 40, is able to monitor a status of the registered parking spot 24 and the user's vehicle 22, including at least one of: when a user 20 arrives at the registered parking spot 24, if the user's vehicle 22 is properly parked within the registered parking spot 24, if the user's vehicle 22 meets dynamic parameter specifications for the registered parking spot 24 and if the user 20 leaves the registered parking spot 24 at an appropriate time.

In an exemplary embodiment, the network database 30A, 30B of registered parking spots 24 is adapted to update the dynamic parameters for a registered parking spot 24 based on formation of a contract between the user 20 and owner of the registered parking spot 24, and data received, via the monitoring engine 16G, of the status of the registered parking spot 24. For example, when a contract is formed for a registered parking spot 24 to be occupied by a user 20 for a specified time frame on a specific date, the network database 30A, 30B receives this information from the back-office server 12 and updates the dynamic parameters of that registered parking spot 24 to show that the registered parking spot 24 is unavailable during time frame and date of the contract. In another example, a user 20 may enter into a contract to use a registered parking spot 24 specifically for charging purposes, with the intent to vacate the registered parking spot 24 once the vehicle 22 is fully charged. Thus, when the network database 30A, 30B receives information from the monitoring engine 16G of the back-office server 12 that a user's vehicle 22 is fully charged, this data can be used to infer that the registered parking spot 24 will soon be vacated by the user 20, and the network database 30A, 30B can update the availability of the registered parking spot 24.

Figure 6:
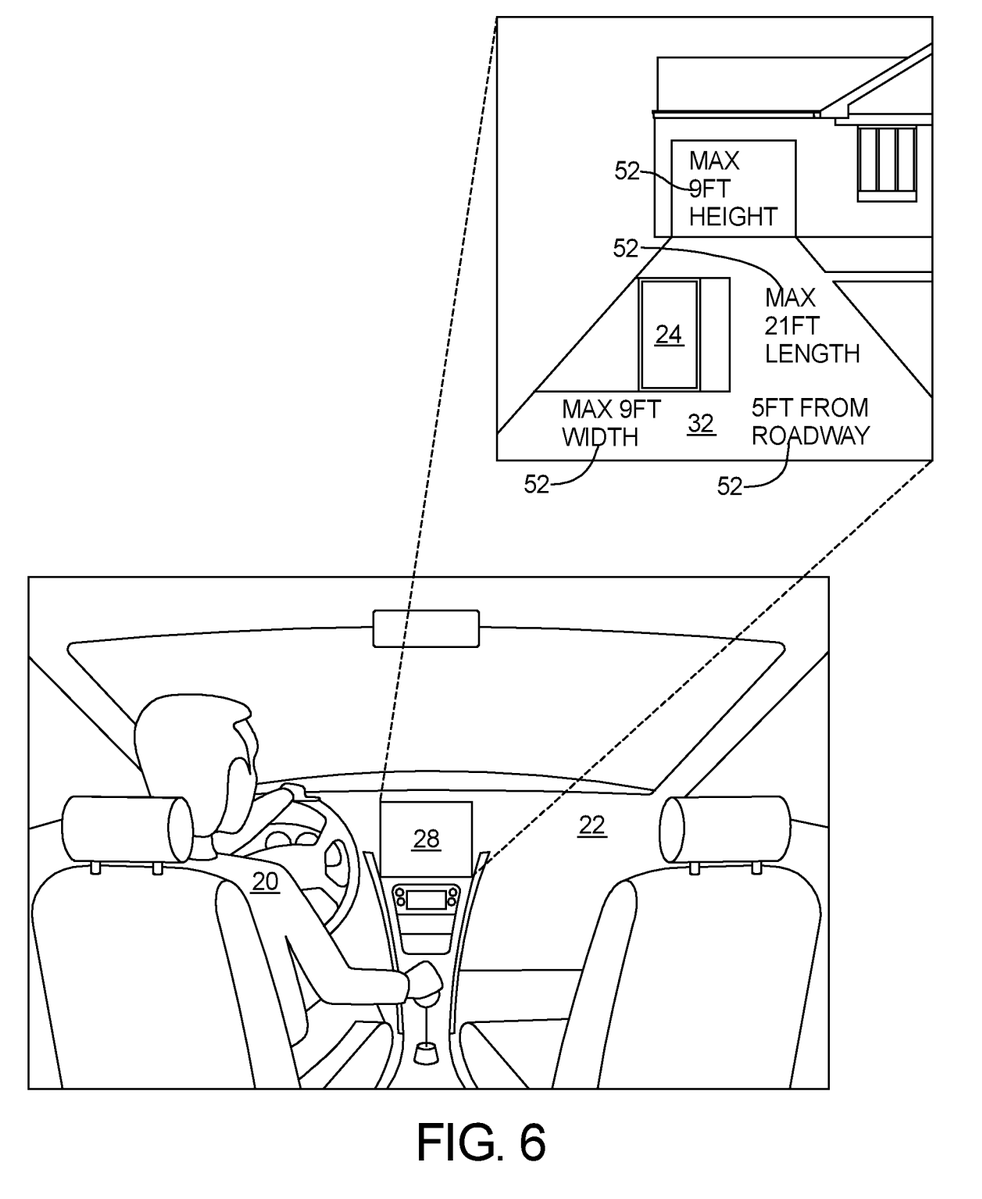
FIG. 6 is a schematic view of a user's vehicle wherein the HMI display therein presents an image including dynamic parameters of a selected registered parking spot for the user.

In an exemplary embodiment, when the user's vehicle 22 is equipped with autonomous driving capability, the back-office server 12 is adapted to send GPS data to an autonomous vehicle control system 48 within the user's vehicle 22, wherein, once the user 20 has selected a registered parking spot 24, and a contract has been formed, the user's vehicle 22 will autonomously navigate through the best possible path (less congested/nearest gate, etc.) to the registered parking spot 24. If the user's vehicle 22 is not equipped with autonomous driving capability, the back-office server 12 sends such GPS data to a navigation system for display to the user 20 on the HMI 28 within the user's vehicle 22 to assist the user 20 in locating and driving to the selected registered parking spot 24 through the best possible path. Further, when the user's vehicle 22 is equipped with an automated parking assistance system 50, the back-office server 12 uploads dynamic parameters of the registered parking spot 24, such as specifics of the dimensions and directions on where to locate the vehicle 22 within the registered parking spot 24 to the automated parking assistance system 50 of the user's vehicle 22. This data is used by the automated parking system 50 of the user's vehicle 22 to autonomously park the user's vehicle 22 within the registered parking spot 24. If the user's vehicle 22 is not equipped with an automated parking assistance system 50, the back-office server 12 uploads dynamic parameters 52 of the registered parking spot 24 to a human machine interface display 28 within the user's vehicle 22, to assist the user 20 when parking the vehicle 22, as shown in FIG. 6.

Figure 7:
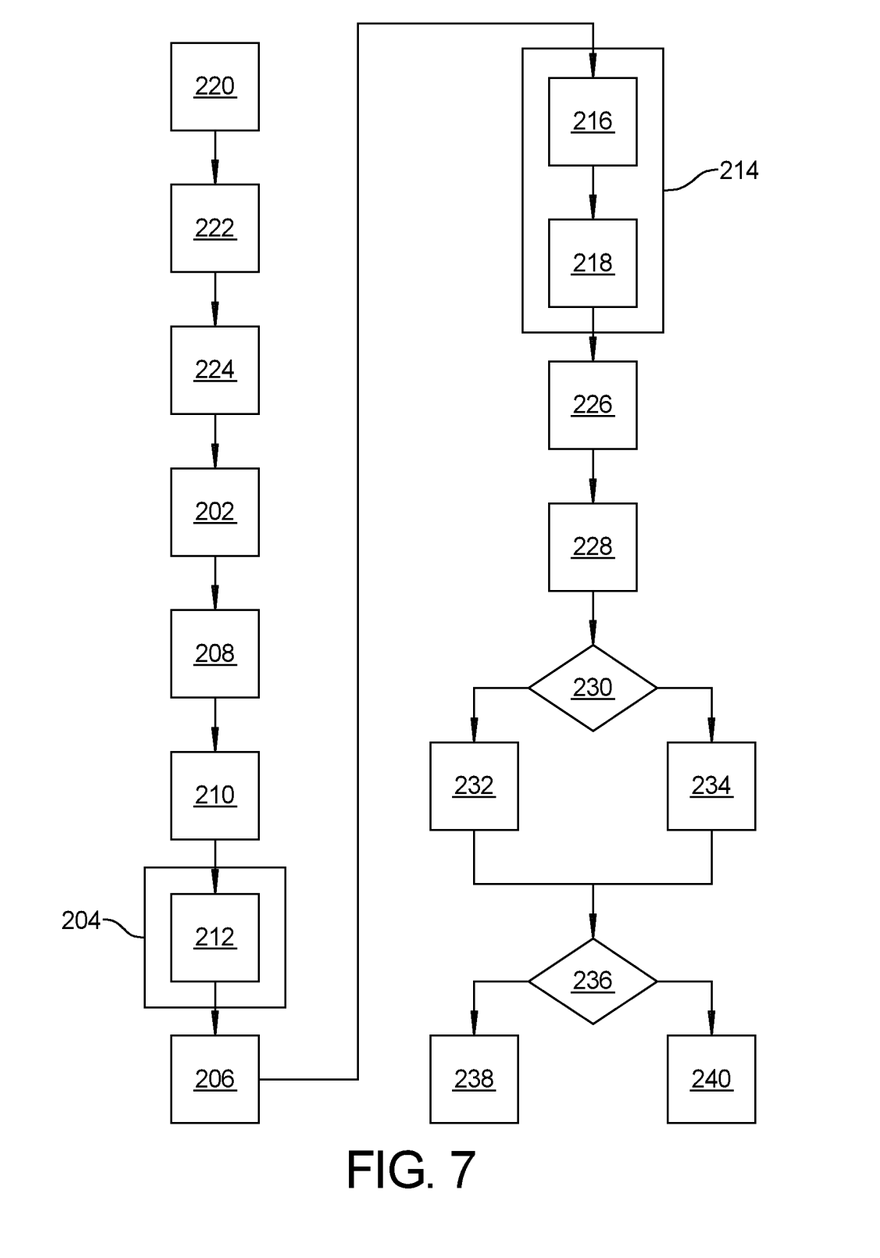
FIG. 7 is a flow chart illustrating a method according to an exemplary embodiment.

Referring to FIG. 7, a method 200 of providing vehicle parking spots 24 with a resource sharing marketplace platform 10 includes, at block 202, receiving, via a wireless communication module 18 in communication with a controller 14 of a back-office server 12 that is adapted to run a plurality of integrated systems 16A-16G, a request from a user 20, moving to block 204, collecting, via the wireless communication module 18, data related to available registered parking spots 24 from a network database 30A, 30B of registered parking spots 24, and, moving to block 206, providing a response to the user 20 including a sub-group of registered parking spots 24.

In an exemplary embodiment, the plurality of integrated systems 16A-16G includes a gateway system 16A and a query builder 16B, the method 200 including, moving to block 208, authenticating user 20 identification, facilitating the user's 20 log in to the resource sharing marketplace platform 10, and receiving the request from the user 20 with the gateway system 16A, and, moving to block 210, identifying, with the query builder 16B, dynamic parameters 52 related to the request from the user 20.

In another exemplary embodiment, the plurality of integrated systems 16A-16G includes a query analyzer 16C, the collecting, via the wireless communication module 18, data related to available registered parking spots 24 from a network database 30A, 30B of registered parking spots 24 at block 204 further including, moving to block 212, identifying, with the query analyzer 16C, from the network database 30A, 30B of registered parking spots 24, the sub-group of registered parking spots 24 that satisfy the dynamic parameters 52 related to the request from the user 20 and are available to the user 20.

In another exemplary embodiment, the plurality of integrated systems 16A-16G includes a contract builder 16D, the method 200 including, moving to block 214, developing, with the contract builder 16D, a contract between the user 20 and an owner of a registered parking spot 24 that satisfies the dynamic parameters related to the request from the user 20 and is available to the user 20.

In another exemplary embodiment, the plurality of integrated systems 16A-16G includes a messaging broker 16E and a solving engine 16F, wherein the identifying, with the query analyzer 16C, from the network database 30A, 30B of registered parking spots 24, the sub-group of registered parking spots 24 that satisfy the dynamic parameters related to the request from the user 20 and are available to the user 20 at block 212 further includes selecting, with the solving engine 16F, the sub-group of registered parking spots 24 that satisfy the dynamic parameters related to the request from the user 20 and are available to the user 20.

Further, the developing, with the contract builder 16D, a contract between the user 20 and an owner of a registered parking spot 24 that satisfies the dynamic parameters related to the request from the user 20 and is available to the user 20 at block 214 further includes, moving to block 216, sending, with the messaging broker 16E, a request for access to registered parking spots 24 that satisfy the dynamic parameters related to the request from the user 20 and are available to the user 20 to owners of the registered parking spots 24 that satisfy the dynamic parameters related to the request from the user 20 and are available to the user 20, and, moving to block 218, negotiating, with the solving engine 16F, a contract between the user 20 and the owner of a registered parking spot 24 that satisfies the dynamic parameters related to the request from the user 20, is available to the user 20 and is selected by the user 20.

In another exemplary embodiment, the method 200 further includes, moving to block 220, registering, by an owner, via the wireless communication module 18, a parking spot 24 within the network database 30, moving to block 222, entering, by the owner, via the wireless communication module 18, dynamic parameters 52 associated with the registered parking spot 24, and, moving to block 224, modifying, by the owner, via the wireless communication module 18, the dynamic parameters 52 associated with the registered parking spot 24.

In another exemplary embodiment, the plurality of integrated systems 16A-16G includes a monitoring engine 16G, the method 200 including, moving to block 226, receiving input, with the monitoring engine 16G, via the wireless communication module 18, from external monitoring sources 40 and determining, with the monitoring engine 16G, a status of a registered parking spot 24, including at least one of: when a user 20 arrives at the registered parking spot 24, if the user's vehicle 22 is properly parked within the registered parking spot 24, if the user's vehicle 22 meets dynamic parameter specifications for the registered parking spot 24 and if the user 20 leaves the registered parking spot 24 at an appropriate time, and, moving to block 228, updating, with the network database 30, the dynamic parameters 52 for a registered parking spot 24 based on formation of a contract between the user 20 and owner of the registered parking spot 24 and data received, via the monitoring engine 16G, of the status of the registered parking spot 24.

In another exemplary embodiment, moving to block 230, if the user's vehicle 22 is equipped with autonomous driving capability, the method 200 further includes, moving to block 232, sending, with the back-office server 12, via the wireless communication module 18, GPS data to an autonomous vehicle control system 48 within the user's vehicle 22 to allow the user's vehicle 22 to autonomously navigate to the registered parking spot 24. If at block 230, the user's vehicle 22 is not equipped with autonomous driving capability, the method 200 further includes, moving to block 234, sending, with the back-office server 12, via the wireless communication module 18, GPS data to a navigation system within the user's vehicle 22.

Moving to block 236, if the user's vehicle 22 is equipped with an automated parking assistance system 50, the method 200 further includes, moving to block 238, uploading, with the back-office server 12, via the wireless communication module 18, dynamic parameters 52 of the registered parking spot 24 to the automated parking assistance system 50 of the user's vehicle 22. If, at block 236, the user's vehicle 22 is not equipped with an automated parking assistance system 50, the method 200 includes, moving to block 240, uploading, with the back-office server 12, via the wireless communication module 18, dynamic parameters 52 of the registered parking spot 24 to a human machine interface 28 display within the user's vehicle 22.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A resource sharing marketplace platform for vehicle parking spots, comprising:
   a back-office server including a controller adapted to run a plurality of integrated systems and a wireless communication module in communication with the controller;
   wherein, the resource sharing marketplace platform is adapted to:
   receive, via the wireless communication module, a request from a user;

establish dynamic parameters related to the request from the user;

collect, via the wireless communication module, data related to available registered parking spots from a network database of registered parking spots;

provide a response to the user including a sub-group of registered parking spots; and at least one of:
  automatically, via communication with an autonomous vehicle control system within the vehicle, navigate the vehicle to a selected one of the sub-group of registered parking spots;
  send GPS data related to the selected one of the sub-group of registered parking spots to a navigation system within the user's vehicle;
  upload dynamic parameters of the selected one of the sub-group of registered parking spots to an automated parking assistance system of the user's vehicle and automatically, via the automated parking assistance system, parking the user's vehicle within the selected one of the sub-group of registered parking spots; and
  upload dynamic parameters of the registered parking spot to a human machine interface display within the user's vehicle;

the plurality of integrated systems including:

a gateway system adapted to authenticate user identification, facilitate the user's log in to the resource sharing marketplace platform, and receive the request from the user;

a query builder adapted to identify dynamic parameters related to the request from the user;

a query analyzer adapted to identify, from the network database of registered parking spots, the sub-group of registered parking spots that satisfy the dynamic parameters related to the request from the user and are available to the user;

a contract builder adapted to develop a contract between the user and an owner of a registered parking spot that satisfies the dynamic parameters related to the request from the user and is available to the user;

a messaging broker adapted to send a request for access to registered parking spots that satisfy the dynamic parameters related to the request from the user and are available to the user to owners of the registered parking spots that satisfy the dynamic parameters related to the request from the user and are available to the user;

a solving engine adapted to select the sub-group of registered parking spots that satisfy the dynamic parameters related to the request from the user and are available to the user, and negotiate the contract between the user and the owner of a registered parking spot that satisfies the dynamic parameters related to the request from the user, is available to the user and is selected by the user; and a monitoring engine adapted to receive input, via the wireless communication module, from external monitoring sources and to determine a status of a registered parking spot, including at least one of: when a user arrives at the registered parking spot, if the user's vehicle is properly parked within the registered parking spot, if the user's vehicle meets dynamic parameter specifications for the registered parking spot and if the user leaves the registered parking spot at an appropriate time;

the network database of registered parking spots adapted to:

allow an owner of a parking spot to, via the wireless communication module, register a parking spot within the network database, enter dynamic parameters associated with the registered parking spot, and modify the dynamic parameters associated with the registered parking spot; and update the dynamic parameters for a registered parking spot based on formation of a contract between the user and owner of the registered parking spot, and data received, via the monitoring engine, of the status of the registered parking spot.

2. The resource sharing marketplace platform of claim 1, wherein the back-office server is adapted to:

when the user's vehicle is equipped with autonomous driving capability, send GPS data to an autonomous vehicle control system within the user's vehicle to allow the user's vehicle to autonomously navigate to the registered parking spot;

when the user's vehicle is not equipped with autonomous driving capability, send GPS data to a navigation system within the user's vehicle;

when the user's vehicle is equipped with an automated parking assistance system, uploading dynamic parameters of the registered parking spot to the automated parking assistance system of the user's vehicle; and when the user's vehicle is not equipped with an automated parking assistance system, uploading dynamic parameters of the registered parking spot to a human machine interface display within the user's vehicle.

* * * * *